United States Patent
Porchet et al.

(10) Patent No.: US 7,145,567 B2
(45) Date of Patent: Dec. 5, 2006

(54) BITSTREAM FORMAT AND READING AND WRITING METHODS AND APPARATUS THEREFOR

(75) Inventors: Jean-Marc Porchet, Montreal (CA); Michel Eid, Montreal (CA)

(73) Assignee: Avid Technology, Inc., Tewksbury, MA (US)

( * ) Notice: Subject to any disclaimer, the term of this patent is extended or adjusted under 35 U.S.C. 154(b) by 59 days.

(21) Appl. No.: 10/406,013

(22) Filed: Apr. 3, 2003

(65) Prior Publication Data
US 2004/0196291 A1 Oct. 7, 2004

(51) Int. Cl.
G06F 12/02 (2006.01)
G06F 12/00 (2006.01)
G06T 1/60 (2006.01)

(52) U.S. Cl. ............... 345/543; 345/530; 711/212
(58) Field of Classification Search ............ 345/543, 345/530; 711/212, 206, 203, 220
See application file for complete search history.

(56) References Cited

U.S. PATENT DOCUMENTS

| 4,677,421 A | 6/1987 | Taniyama |
| 4,965,668 A | 10/1990 | Abt et al. |
| 5,081,450 A | 1/1992 | Lucas et al. |
| 5,237,316 A | 8/1993 | Cox, Jr. et al. |

(Continued)

FOREIGN PATENT DOCUMENTS

EP 0387882 9/1990

(Continued)

OTHER PUBLICATIONS

Symes, Peter D., "Ten-Bit Processing in an 8-Bit Environment", SMPTE Journal, Jun. 1989, pp. 444-446.

*Primary Examiner*—Ulka Chauhan
*Assistant Examiner*—Joni Hsu
(74) *Attorney, Agent, or Firm*—Peter J. Gordon; John A. Hamilton

(57) ABSTRACT

Image data having a bit depth of m bits, where m is not a power of two, may be divided into two parts for storage. The first part is the n most significant bits, where n is a power of two. The second part is the k least significant bits, where k=m−n and k<n. For example, 10-bit data may be separated into 8-bit and 2-bit parts. The 8-bit data for a given image is placed in the bitstream as a contiguous block with the end of the data aligned with a memory boundary, such as a page boundary. The 2-bit data is collected into bytes that are placed in the bitstream as a contiguous block. The block of 2-bit data is placed in the bitstream preceding and contiguous with the block of 8-bit data. Padding may be provided to align the beginning of the image data with a memory boundary. The image data for multiple images may be placed in the bitstream contiguously for storage. 10-bit data for an alpha channel, if any, also may be split into 8-bit and 2-bit parts. The 8-bit alpha data for a given image is placed in the bitstream as a contiguous block with the beginning of the data aligned with a memory boundary, such as a page boundary. The 2-bit alpha data is collected into bytes that are placed in the bitstream as a contiguous block. The block of 2-bit alpha data is placed in the bistream subsequent to and contiguous with the block of 8-bit alpha data. Padding may be provided to align the end of the alpha data with a page boundary. The alpha data for multiple images may be placed in the bitstream contiguously for storage.

6 Claims, 5 Drawing Sheets

U.S. PATENT DOCUMENTS

| | | | |
|---|---|---|---|
| 5,557,763 A | * | 9/1996 | Senter et al. ................. 712/23 |
| 5,570,356 A | | 10/1996 | Finney et al. |
| 5,590,326 A | * | 12/1996 | Manabe ..................... 711/150 |
| 5,649,217 A | | 7/1997 | Yamanaka et al. |
| 5,673,065 A | | 9/1997 | DeLeeuw |
| 6,239,815 B1 | * | 5/2001 | Frink et al. ................. 345/502 |

| | | |
|---|---|---|
| 2001/0049778 A1 | 12/2001 | Van Der Vleuten et al. |

FOREIGN PATENT DOCUMENTS

| | | |
|---|---|---|
| EP | 0405885 | 1/1991 |
| EP | 0647067 | 4/1995 |
| GB | 2269922 | 2/1994 |

* cited by examiner

BITSTREAM FORMAT AND READING AND WRITING METHODS AND APPARATUS THEREFOR

BACKGROUND

Image data has multiple sampling resolutions. There is a temporal sampling rate, commonly called the frame rate, of motion picture data. Each image also has a vertical and horizontal sampling resolution indicating the number of individual elements, commonly called pixels, in the horizontal and vertical dimensions of the image. Each pixel typically is represented by a number of components to define a color. The components may represent luminance and chrominance (YCrCb, for example), or may represent color channels (red, green and blue, for example). A value for each component generally is represented using a number of bits called the bit depth. Typical bit depths used for images are eight bits, ten bits and sixteen bits.

High quality digital video processing systems often use a bit depth per component of ten bits. This bit depth provides a good tradeoff between quality and bandwidth and efficient implementation of processing functions in hardware. However, on a general-purpose computer, bit paths have a bit depth based on a power of two (e.g. eight, sixteen, thirty-two or sixty-four bits). Therefore, 10-bit data generally is converted to 16-bit data before it is processed by the computer. It would be inefficient however to transmit or to store the full sixteen bits.

Sometimes it is also desirable to process image data using a bit depth of only eight bits. An 8-bit representation may be obtained from a 10-bit representation by truncation or rounding. However, data would be lost if only eight bits were transmitted or stored.

To store 10-bit data on disk, techniques have been developed to pack the 10-bit data into data words having a bit depth based on a power of two (such as 8-bit and 32-bit words). For example, in U.S. Pat. No. 6,239,815, 10-bit YCrCb data for two pixels is packed into five bytes. Another commonly used packing format, referred to as "10:10:10:2," is used, for example, in the OpenGL graphics system. OpenGL is a trademark of Silicon Graphics, Inc. In this format, three 10-bit values are stored in a 32-bit word, with two bits left unused. With this packed data, however, several operations are performed to extract either 8-bit or 10-bit data.

SUMMARY

Image data having a bit depth of m bits, where m is not a power of two, may be divided into two parts for storage. The first part is the n most significant bits, where n is a power of two. The second part is the k least significant bits, where k=m−n and k<n. For example, 10-bit data may be separated into 8-bit and 2-bit parts. The 8-bit data for a given image is placed in the bitstream as a contiguous block with the end of the data aligned with a memory boundary, such as a page boundary. The 2-bit data is collected into bytes that are placed in the bitstream as a contiguous block. The block of 2-bit data is placed in the bitstream preceding and contiguous with the block of 8-bit data. Padding may be provided to align the beginning of the image data with a memory boundary. The image data for multiple images may be placed in the bitstream contiguously for storage.

10-bit data for an alpha channel, if any, also may be split into 8-bit and 2-bit parts. The 8-bit alpha data for a given image is placed in the bitstream as a contiguous block with the beginning of the data aligned with a memory boundary, such as a page boundary. The 2-bit alpha data is collected into bytes that are placed in the bitstream as a contiguous block. The block of 2-bit alpha data is placed in the bistream subsequent to and contiguous with the block of 8-bit alpha data. Padding may be provided to align the end of the alpha data with a page boundary. The alpha data for multiple images may be placed in the bitstream contiguously for storage.

For storage, the alpha data may be stored in a data file that is separate from the data file that stores the image data. In that manner the alpha data need not be accessed if it is not to be processed. When the alpha data is to be processed, it can be read from the alpha data file and interleaved with the image data from the image data file in memory for efficient processing. Thus the image data and alpha data for each image are contiguous in the bitstream, and data for multiple images are contiguous in the bitstream.

By storing 10-bit data in such a format, packing is efficient. It also allows access to the 8-bit portion of a single image without any CPU, disk or memory bandwidth overhead. For access to multiple images, scatter/gather operations by the operating system permit efficient access to the 8-bit portion of the image. The 10-bit data can be read and converted to 16-bit words, and vice versa, using scatter/gather and simple shift operations. Data in this format also can be converted to and from sixteen bits per component with minimal processing overhead.

Accordingly, in one aspect, a computer information product includes a computer readable medium with data stored on the computer readable medium that, when interpreted by a computer, includes a bitstream including m-bit image data. The bitstream includes, for each frame of image data, a first data portion including n most significant bits of the m-bit image data for all pixels in the frame in a contiguous block. N is an integer and a power of two. A second data portion includes k least significant bits of the m-bit image data for all pixels in the frame in a contiguous block. K equals the difference between m and n. The first data portion ends on a memory page boundary. The second data portion precedes and is contiguous with the first data portion in the bitstream.

In another aspect, a method and computer program product reads a bitstream of m-bit image data. The bitstream includes, for each frame of image data, a first data portion including n most significant bits of the m-bit image data for all pixels in the frame in a contiguous block, and a second data portion including k least significant bits of the m-bit image data for all pixels in the frame in a contiguous block. N is an integer and a power of two. K equals the difference between m and n. The first data portion ends on a memory page boundary. The second data portion precedes and is contiguous with the first data portion in the bitstream. The method for reading involves accessing an n-bit representation for a single frame of image data. An offset and a size of the n-bit data for the single frame in the bitstream is determined. The offset is rounded down to the nearest memory boundary. The size is rounded up to the nearest boundary. A read operation is performed on the bitstream using the rounded offset and rounded size.

In another aspect, a method and computer program product writes m-bit image data into a bitstream. For each frame of the image data, memory for the bitstream is allocated. The n most significant bits of each m-bit value of the frame are gathered to provide n-bit values. N is an integer and a power of two. The gathered n-bit values are placed as a contiguous block in a first data portion of the bitstream in the allocated memory. The first data portion ends on a memory boundary.

The k least significant bits of each m-bit value of the frame are gathered into n-bit words of the k-bit values. The n-bit words of k-bit values are placed as a contiguous block in a second data portion of the bitstream in the allocated memory. The second data portion precedes and is contiguous with the first data portion in the bitstream.

DETAILED DESCRIPTION

Image data having a bit depth of m bits, where m is not a power of two, may be divided into two parts for storage. The first part is the n most significant bits, where n is a power of two. The second part is the k least significant bits, where k=m−n and k<n. In the following example, 10-bit data is separated into 8-bit and 2-bit parts.

Figure 1:
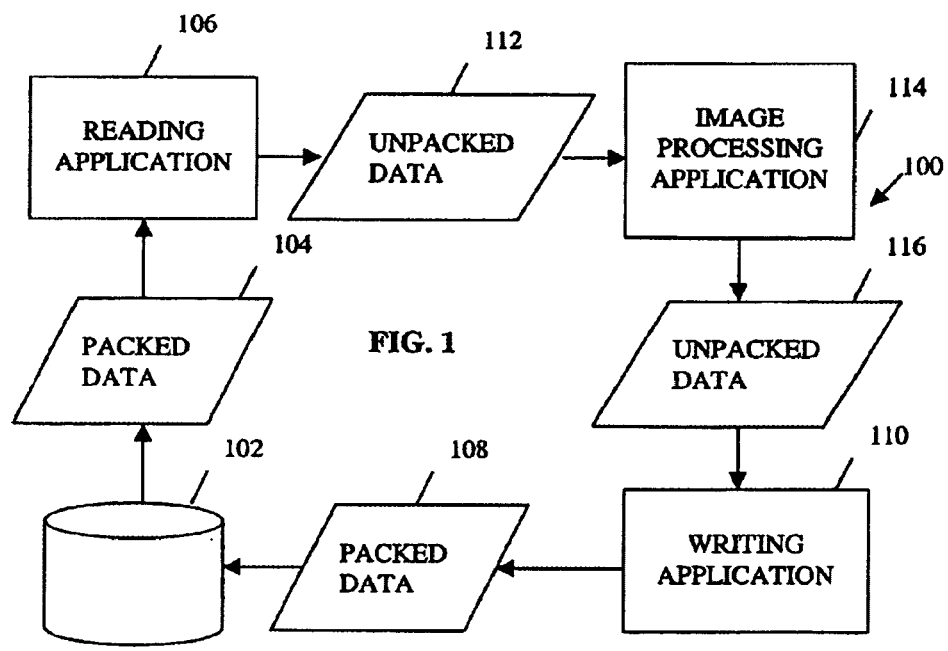
FIG. 1 is data flow diagram of an example image processing system that uses packed 10-bit data.

FIG. 1 is data flow diagram of an example image processing system that uses packed 10-bit data. The image processing system 100 includes data storage 102 that stores 10-bit data packed in a bitstream, which may be stored, for example, in one or more data files or which may be referenced by metadata in a file format such as MXF or AAF. Such a bitstream also may be stored in memory, such as a cache. This bitstream format also may be used as a format for transmission of data, in which case 102 represents a transmission medium over which the compressed image data is transmitted as computer readable signals. Data 104 including a 10-bit packed bitstream is read by a reading application 106. Such data, shown at 108, is written into such a format by a writing application 110, in a manner described below.

The reading application 106 reads, in a manner described below, either a single frame or multiple frames of 8-bit image data or a single frame or multiple frames of 10-bit image data from the bitstream. The reading application 106 provides the read image data 112 to an image processing application 114.

The image processing application 114 performs operations on the image data to produce processed image data 116. For example, such image processing operations may include, but are not limited to, operations for combining images, such as compositing, blending, and keying, or operations within an image, such as resizing, filtering, and color correction, or operations between two images, such as motion estimation. The results of such image processing operations may be image data in a 10-bit format or may be in another format. The image processing application also may be an application that captures and/or creates digital image data, without using any input image data. The image processing application also may manipulate metadata about the image data, for example to define a sequence of scenes of motion video information. The image processing application also may playback image data in one or more formats, without providing any output data.

Although FIG. 1 shows only one image processing operation, there may be multiple image processing operations that may operate in parallel on the data or may operate as a sequence of operations. There are a variety of ways in which an image processing operation may process image data, and the invention is not limited thereby. As an example, the reading application and/or the image processing application and/or the writing application may be part of a larger application for editing video information and may access the image data in the same buffer in memory. As another example, the reading application and/or image processing application and/or the writing application may "plug-in" to an editing application that permits access to image data in memory through an application programming interface (API). The reading and writing applications may be implemented in hardware that is accessed by the image processing application.

Figure 2:
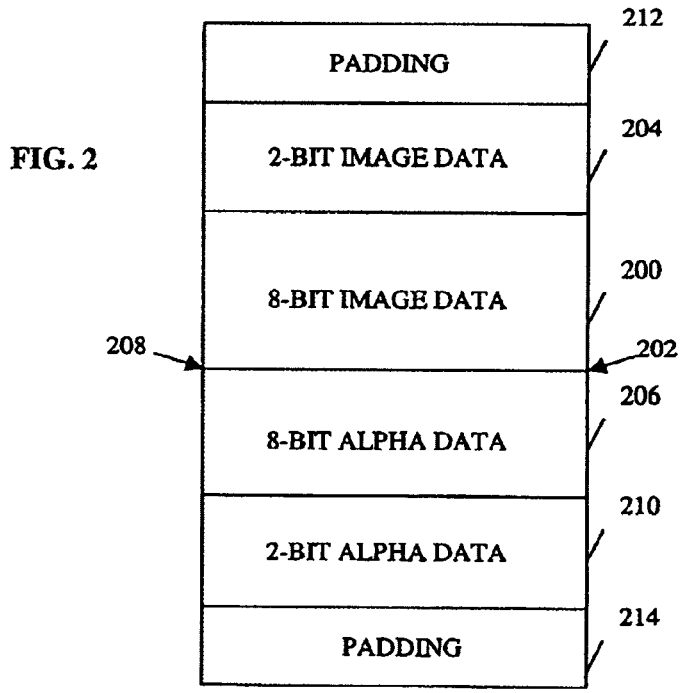
FIG. 2 is a diagram of an example packed form of 10-bit data.

Referring now to FIG. 2, the 8-bit data for a given image is placed in the bitstream as a contiguous block 200 with the end 202 of the data aligned with a memory boundary, such as a page boundary. The 2-bit data is collected into bytes that are placed in the bitstream as a contiguous block 204. The block of 2-bit data is placed in the bitstream preceding and contiguous with the block 200 of 8-bit data. Padding 212 may be provided to align the beginning of the image data with a memory boundary. The image data for multiple images may be placed in a bitstream contiguously for storage.

10-bit data for an alpha channel, if any, also may be split into 8-bit and 2-bit parts. The 8-bit alpha data for a given image is placed in the bitstream as a contiguous block 206 with the beginning 208 of the data aligned with a memory page boundary. The 2-bit alpha data is collected into bytes that are placed in the bitstream as a contiguous block 210. The block of 2-bit alpha data is placed in the bistream subsequent to and contiguous with the block 206 of 8-bit alpha data. Padding 214 may be provided to align the end of the alpha data with a memory boundary. The alpha data for multiple images may be placed in a bitstream contiguously for storage.

For storage, the alpha data may be stored in a data file that is separate from the data file that stores the image data. In that manner the alpha data need not be accessed if it is not to be processed. When the alpha data is to be processed, it can be read from the alpha data file and interleaved with the image data from the image data file in memory for efficient processing. Thus the image data and alpha data for each image are contiguous in the bitstream, and data for multiple images are contiguous in the bitstream.

Data is continuous in a bitstream if the offset and size of one block of data in the bitstream can be used to determine the offset of another block of data that is contiguous with it in that bitstream. Contiguous does not mean that data are stored in adjacent storage locations in any storage medium. Each block of data may have header and/or footer information stored in the block. The presence of such headers and footers does not affect whether blocks of data are contiguous.

Figure 3:
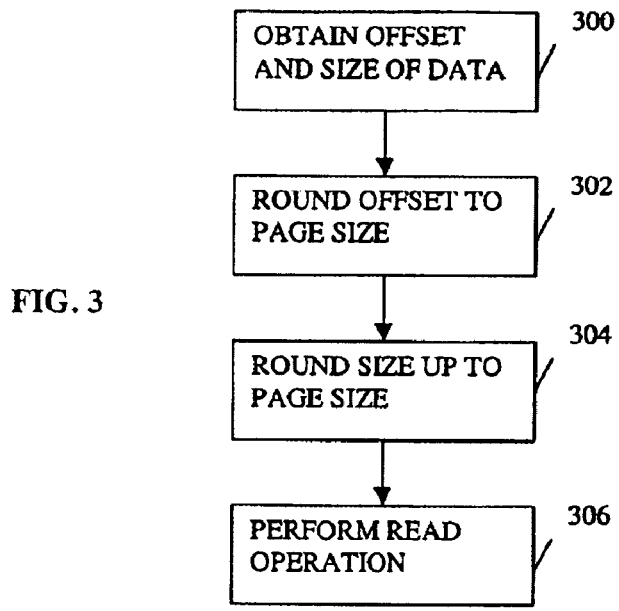
FIG. 3 is a flow chart describing how a single frame of 8-bit image data is read.

FIG. 3 is a flow chart describing how a single frame of 8-bit image data is read from a bitstream such as shown in FIG. 2. The size of the desired 8-bit data and its offset in the bitstream is determined (300). The offset of the read operation is determined (302) by rounding down the offset of the desired 8-bit data in the bitstream to the nearest page boundary. This value is rounded down by computing the offset modulo 4096, and subtracting this value from the offset. The size of read operation is determined (304) by rounding up the size of the 8-bit data to a multiple of the page boundary. This value is rounded up by computing the offset modulo 4096 and adding it to the 8-bit size. The data starting at the determined offset and having the determined size is then read (306). The difference between the actual 8-bit offset and the rounded down 8-bit offset is the amount of data at the beginning of the read data that may be discarded.

For example, assume an image has a total active image data size of 5184000 bytes. Assuming a page size of 4096 (4K) bytes, the total size of the data is 5185536 bytes. Therefore, the block of data representing the image includes padding of 1536 bytes, 2-bit data of 1036800 bytes and 8-bit data of 4147200 bytes. The offset of the 8-bit portion is the sum of the padding size and the 2-bit data size, thus, 1038336 bytes. The offset for the read operation is the 8-bit offset less that offset modulo 4096, and thus 1036288. The size for the read operation is the 8-bit size plus the 8-bit offset modulo 4096, and thus 4149248. Thus, 2048 bytes at the beginning of the read data is discarded. Any alpha information for the image is not read.

If there is alpha information, the 8-bit alpha information for a single frame may be accessed in the following way. A read operation starts reading at the beginning of the 8-bit alpha information for the image. The size of the read operation is the size of the 8-bit alpha information, rounded up to the nearest page size. The difference between the read size and the actual size of the 8-bit alpha information indicates the amount of data to discard at the end of the read data. The beginning of the 10-bit alpha information may be placed in a bitstream contiguous with the end of the 10-bit image data.

Figure 4:
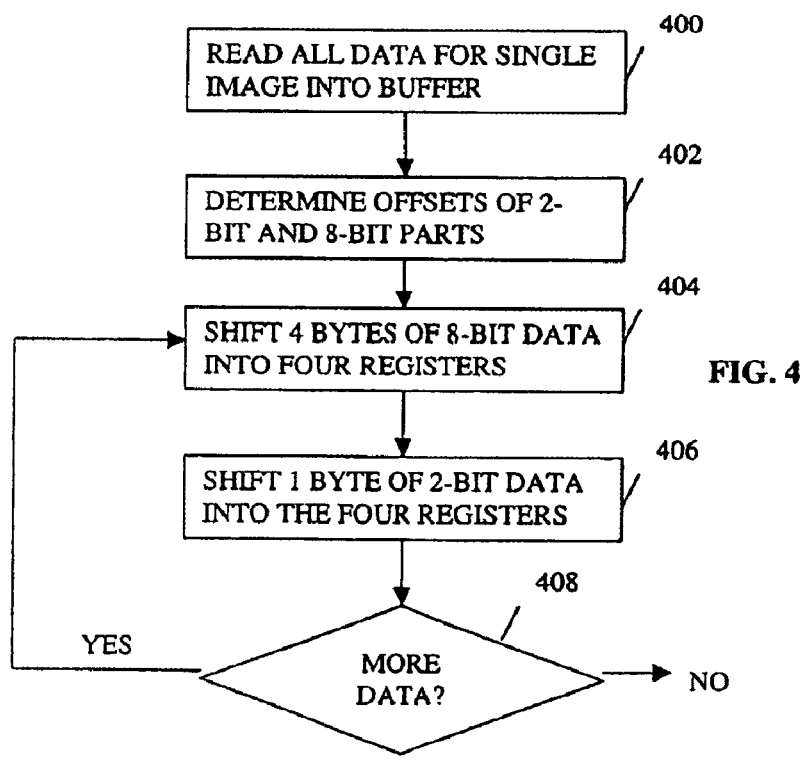
FIG. 4 is a flow chart describing how a single frame of 10-bit image data is read.

FIG. 4 is a flow chart describing how a single frame of 10-bit image data is read from a bitstream. The entire frame of image data is read (400) into a buffer. Offsets in the buffer for the 8-bit and 2-bit portions are determined (402). Four bytes of the 8-bit image data are shifted (404) into the least significant bit of four 16-bit registers, most significant bit first. From the corresponding byte of 2-bit image data, each 2-bit datum is shifted (406), most significant bit first, into the same least significant bit of the 16-bit register that stores corresponding 8-bit data. The result of these operations is a 16-bit integer value, in each register, with the 6 most significant bits set to zero and the 10 least significant bits representing the desired 10-bit value. In a hardware implementation, two DMA engines may be used to write data from a buffer into bit shifters to generate each 10-bit value. After these four values are processed, if any image data remains in the buffer to be processed (as determined at 408), the process repeats for the remaining image data.

If there is alpha information, the 10-bit alpha information for a single frame may be accessed in a similar manner. A read operation starts reading at the beginning of the 8-bit alpha information. The entire amount of 8-bit alpha, 2-bit alpha and padding data for the frame is read into a buffer. The 8-bit and 2-bit alpha data is processed into 10-bit data represented as 16-bit integers in the same manner as the 8-bit and 2-bit image data. The beginning of the 10-bit alpha information may be placed in a bitstream contiguous with the end of the 10-bit image data.

Figure 5:
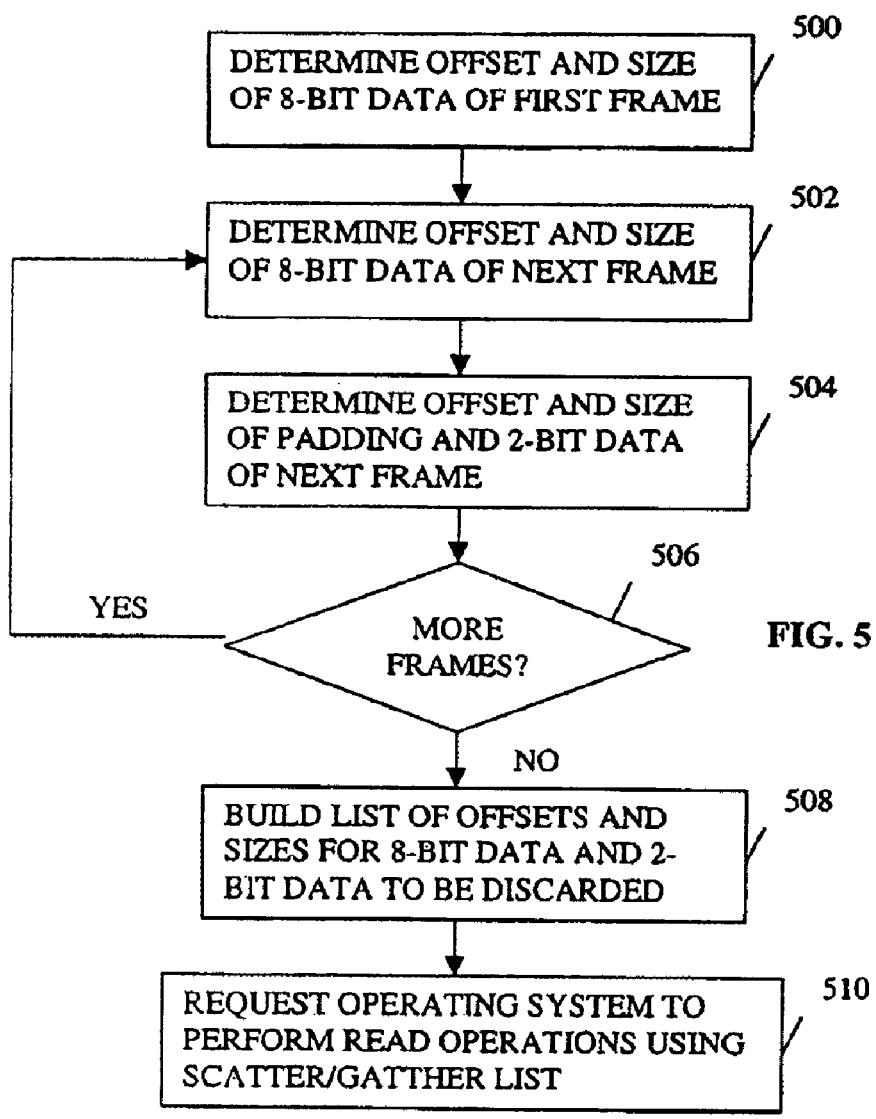
FIG. 5 is a flow chart describing how multiple frames of 8-bit image data are read.

FIG. 5 is a flow chart describing how multiple frames of 8-bit image data are read from a bitstream. Reading multiple frames of 8-bit data involves accessing the first frame of 8-bit data as described above in connection with FIG. 3, then reading the bitstream, including the 2-bit portions, for subsequent images. The data from the subsequent images are accessed using scatter/gather operations provided by the operating system. In particular, the padding and 2-bit portions for each image are read into the same memory locations to discard it.

More particularly, the offset and size of the first frame of 8-bit data in the bitstream, to the nearest page boundary, is determined (500) in the same manner as described above in connection with FIG. 3. For each subsequent frame, the offset and size of the 8-bit data is determined (502). The offset and size of the padding and 2-bit data of that frame also is determined (504). These computations (502, 504) are repeated (506) until the offset and size of the 2-bit and 8-bit data for all frames has been determined. A list of offsets and sizes for 8-bit and 2-bit data is then built (508). This list is provided as a parameter to a scatter/gather read operation request (510) to the operating system. The operating system is requested in particular to direct the padding and 2-bit data to the same memory locations to discard it.

If there is alpha information in a separate data file, and the alpha information is not being used, it can be ignored. If there is alpha information in a separate data file, and the 8-bit alpha information is being used, then the offset and size in the bitstream of each part of the alpha information also is determined. This information is added to the scatter/gather list to instruct the operating system to read the 8-bit alpha information into appropriate buffers interleaved with the 8-bit image data. This information also is used in the scatter/gather list to instruct the operating system to discard the 2-bit alpha information and padding during a read operation in the same manner that the 2-bit image data or padding is discarded.

Figure 6:
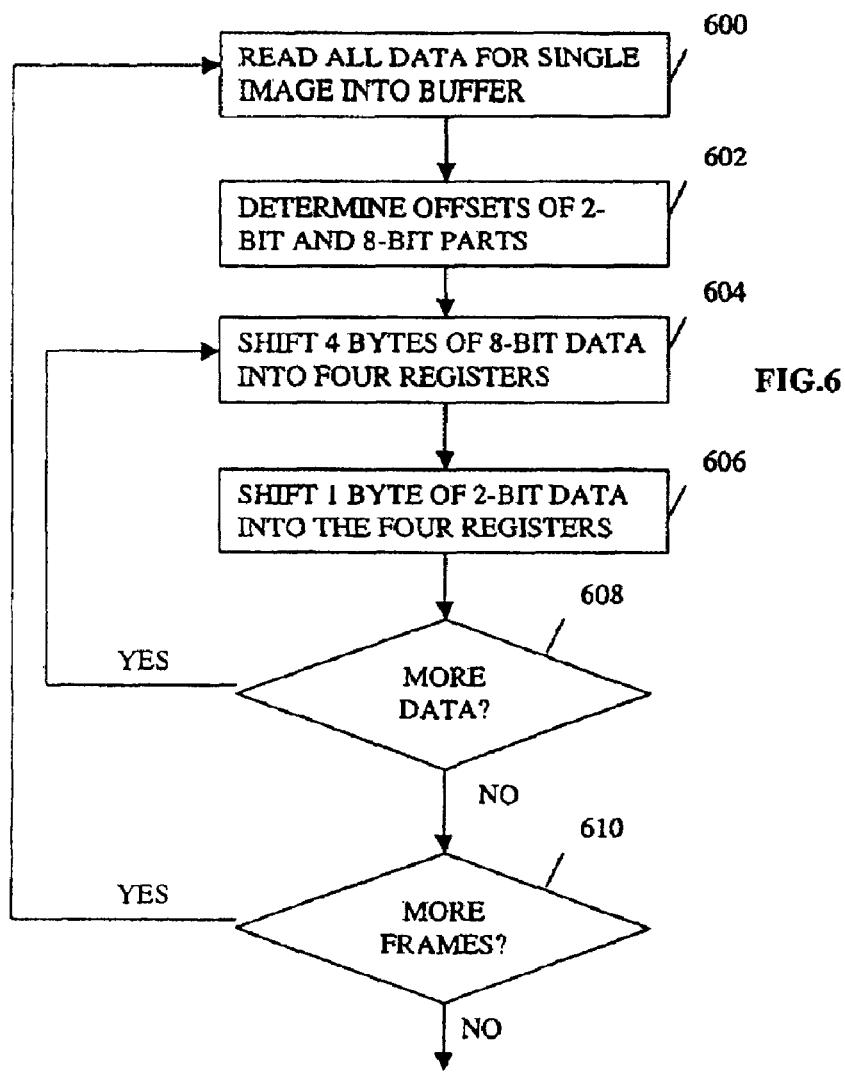
FIG. 6 is a flow chart describing how multiple frames of 10-bit image data are read.

FIG. 6 is a flow chart describing how multiple frames of 10-bit image data are read from a bitstream. For multiple frames of 10-bit data, the process is similar to that of FIG. 4, except that it is repeated for multiple frames. In particular, the entire frame of image data is read (600) into a buffer. Offsets in the buffer for the 8-bit and 2-bit portions are determined (602). Four bytes of the 8-bit image data are shifted (604) into the least significant bit of four 16-bit registers, most significant bit first. From the corresponding byte of 2-bit image data, each 2-bit datum is shifted (606), most significant bit first, into the same least significant bit of the 16-bit register that stores corresponding 8-bit data. After these four values are processed, if any image data remains in the buffer to be processed (as determined at 608), the process repeats for the remaining image data. After the image data has been processed for the image, the process (600, 602, 604, 606, 608) is repeated if any images remain to be processed, as determined at 610.

If there is alpha information in a separate data file, and the alpha information is not being used, it can be ignored. If there is alpha information in a separate data file, and alpha information is being used, then the alpha information is read and processed in the same manner as the image data using the scatter/gather list to interleave the image data and the alpha data in memory. The alpha data also may be converted into 10-bit data represented using 16-bit integers.

Figure 7:
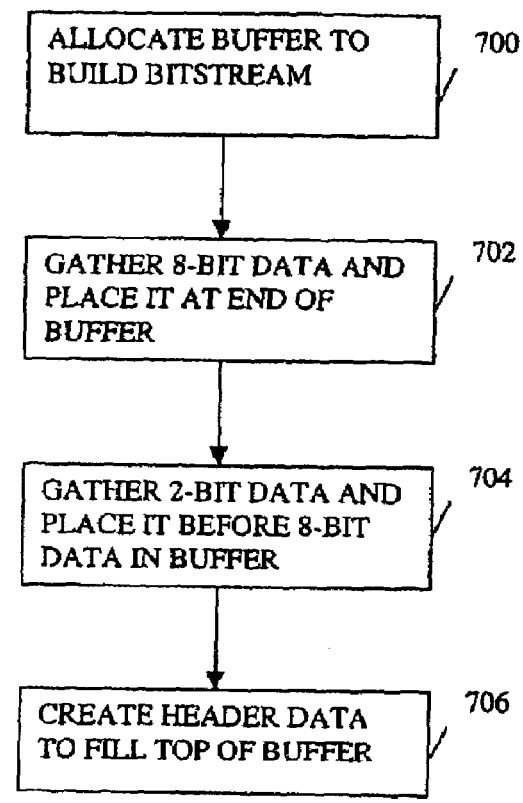
FIG. 7 is a flow chart describing how a each frame of 10-bit image data is written.

FIG. 7 is a flow chart describing how each frame of 10-bit image data is converted into a packed format. Generally 10-bit data is processed by representing 10-bit values as 16-bit integer values, which is assumed to be the input format for this example. For each frame of video information, a buffer is allocated (700) to build the bitstream for the image. The eight most significant bits of the 10-bit video information is located for all pixels in the frame. The 8-bit portions are gathered and placed (702) in a first data portion of the bitstream at the end of the buffer. In particular, the 8-bit data corresponding to the last pixel of the image is placed at the end of the block of 8-bit data and is aligned with a memory page boundary. The two least significant bits of the 10-bit video information is located for all pixels in the frame. The 2-bit portions are gathered into bytes and placed (704) in a second data portion of the bitstream before the 8-bit data in the buffer. Padding or header information is then placed (706) in the buffer prior to second data portion.

Any alpha information may be processed in a similar manner. In particular, 8-bit portions of alpha information may be gathered and placed in a first alpha portion at the beginning of a buffer in a bitstream. The 2-bit portions of the alpha information are gathered and placed in a second alpha portion in the bitstream after the 8-bit alpha portion. Padding or header/footer information is then placed in the buffer to the end of the buffer. The alpha data for multiple images are placed contiguously in the bitsteam and may be stored in a file separate from the image data.

The various components of the system shown in FIG. 1, and the flowcharts of FIGS. 3–7, may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, a cathode ray tube (CRT) display, liquid crystal displays (LCD) and other video output devices, printers, communication devices such as a modem, and storage devices such as disk or tape. One or more input devices may be connected to the computer system. Example input devices include, but are not limited to, a keyboard, keypad, track ball, mouse, pen and tablet, communication device, and data input devices. The invention is not limited to the particular input or output devices used in combination with the computer system or to those described herein.

The computer system may be a general purpose computer system which is programmable using a computer programming language, such as "C++," Visual Basic, JAVA or other language, such as a scripting language or even assembly language. The computer system may also be specially programmed, special purpose hardware. In a general-purpose computer system, the processor is typically a commercially available processor, such as various processors available from Intel, AMD, Cyrix, Motorola, and IBM. The general-purpose computer also typically has an operating system, which controls the execution of other computer programs and provides scheduling, debugging, input/output control, accounting, compilation, storage assignment, data management and memory management, and communication control and related services. Example operating systems include, but are not limited to, the UNIX operating system and those available from Microsoft and Apple Computer.

A memory system typically includes a computer readable medium. The medium may be volatile or nonvolatile, writeable or nonwriteable, and/or rewriteable or not rewriteable. A memory system stores data typically in binary form. Such data may define an application program to be executed by the microprocessor, or information stored on the disk to be processed by the application program. The invention is not limited to a particular memory system.

A system such as described above may be implemented in software or hardware or firmware, or a combination of the three. The various elements of the system, either individually or in combination may be implemented as one or more computer program products in which computer program instructions are stored on a computer readable medium for execution by a computer. Various steps of a process may be performed by a computer executing such computer program instructions. The computer system may be a multiprocessor computer system or may include multiple computers connected over a computer network. The components shown in FIG. 1 may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications are within the capabilities of one of ordinary skill in the art and are contemplated as falling within the scope of the invention.

What is claimed is:

1. A method for reading a bitstream of m-bit image data, wherein the bitstream comprises, for each frame of image data, a first data portion including n most significant bits of the m-bit image data for all pixels in the frame in a contiguous block, wherein n is an integer and a power of two, a second data portion including k least significant bits of the m-bit image data for all pixels in the frame in a contiguous block, wherein k equals the difference between m and n, wherein the first data portion ends on a memory boundary; and wherein the second data portion precedes and is contiguous with the first data portion in the bitstream, the method for reading comprising:
   accessing an n-bit representation for a single frame of image data, including:
      determining an offset and a size of the n-bit representation for the single frame in the bitstream;
      rounding the offset down to the nearest memory boundary;
      rounding the size up to the nearest boundary; and
      performing a read operation on the bitstream using the rounded offset and rounded size.

2. The method of claim 1, wherein the bitstream further comprises alpha information corresponding to each frame of image data, wherein the alpha information for a frame is subsequent to and contiguous in the bitstream with the first data portion for the corresponding frame, the method further comprising:
   determining an offset and a size of n-bit alpha information in the bitstream;
   rounding up the size to the nearest memory boundary;
   performing a read operation on the bitstream using the offset and the rounded size.

3. The method of claim 1, further comprising accessing an n-bit representation of additional frames of image data, comprising:
   determining an offset and a size of the n-bit image data for each additional frame in the bitstream;
   rounding the offset down to the nearest memory boundary;
   rounding the size up to the nearest memory boundary;
   determining an offset and a size for other data in the bitstream corresponding to each additional frame; and instructing an operating system to read the bitstream including the other data and the n-bit image data for each additional frame using a scatter/gather operation so as to discard the other data and retain the n-bit image data in a memory.

4. The method of claim 1, wherein the bitstream is part of the file format for video data stored in a data file.

5. A computer program product, comprising:

a computer readable medium;

computer program instructions stored on the computer readable medium that, when interpreted by a computer, instruct the computer to perform method for reading a bitstream of m-bit image data, wherein the bitstream comprises, for each frame of image data, a first data portion including n most significant bits of the m-bit image data for all pixels in the frame in a contiguous block, wherein n is an integer and a power of two, a second data portion including k least significant bits of the m-bit image data for all pixels in the frame in a contiguous block, wherein k equals the difference between m and n, wherein the first data portion ends on a memory boundary; and wherein the second data portion precedes and is contiguous with the first data portion in the bitstream, the method for reading comprising:

accessing an n-bit representation for a single frame of image data, including:

determine the offset and size of the n-bit representation for the single frame in the bitstream;

rounding the offset down to the nearest memory boundary;

rounding the size up to the nearest memory boundary; and performing a read operation on the bitstream using the rounded offset and the rounded size.

6. The method of claim 5, wherein the bitstream is part of the file format for video data stored in a data file.

* * * * *